US007430167B2

(12) United States Patent
Glaise et al.

(10) Patent No.: US 7,430,167 B2
(45) Date of Patent: Sep. 30, 2008

(54) METHOD AND SYSTEM TO ENABLE AN ADAPTIVE LOAD BALANCING IN A PARALLEL PACKET SWITCH

(75) Inventors: Rene Glaise, Nice (FR); Alain Blanc, Tourrettes sur Loup (FR); Francois Le Maut, Nice (FR); Michel Poret, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 695 days.

(21) Appl. No.: 10/711,320

(22) Filed: Sep. 10, 2004

(65) Prior Publication Data

US 2005/0063301 A1 Mar. 24, 2005

(30) Foreign Application Priority Data

Sep. 18, 2003 (EP) .................................. 03 36809

(51) Int. Cl.
*G06F 11/00* (2006.01)
(52) U.S. Cl. ........................ 370/229; 370/387; 370/389; 370/428
(58) Field of Classification Search ................. 370/387, 370/412, 229, 428
See application file for complete search history.

(56) References Cited

U.S. PATENT DOCUMENTS

| 4,712,216 A | 12/1987 | Glaise |
| 4,931,985 A | 6/1990 | Glaise et al. |
| 4,961,193 A | 10/1990 | Debord et al. |
| 5,043,937 A | 8/1991 | Glaise et al. |
| 5,355,372 A * | 10/1994 | Sengupta et al. ............ 370/367 |
| 5,359,709 A | 10/1994 | Blanc et al. |
| 5,459,740 A | 10/1995 | Glaise |

(Continued)

OTHER PUBLICATIONS

Wang, W.; Dong, L.; Wolf, W., "A distributed switch archtecture with dynamic load-balancing and parallel input-queued crossbars for terabit switch fabrics," INFOCOM 2002. Twenty-First Annual Joint Conference of the IEEE Computer and Communications Societies. Proceedings. IEEE, vol. 1, pp. 352-361 vol. 1, 2002.*

(Continued)

*Primary Examiner*—Hassan Kizou
*Assistant Examiner*—Jeffrey M Rutkowski
(74) *Attorney, Agent, or Firm*—Joseph P. Abate; Daryl Neff

(57) ABSTRACT

A method and a system to adapt the load balancing of the incoming traffic over the planes of a parallel packet switch (PPS) on the basis of the monitoring of requests and acknowledgments exchanged between ingress port adapters and arrays of collapsed virtual output queues (cVOQ) situated within the plane switch cores is disclosed. According to the invention, at least one counter is associated, in each ingress port-adapter, to each individual switching plane or device to be monitored. Each of these counters is incremented when a request is sent to the corresponding individual switching plane or device and decremented when an acknowledgment is received from this individual switching plane or device. When the range of values taken by the counters of a same ingress port-adapter reaches a predetermined threshold, less (or none) incoming traffic is further transmitted to the individual switching plane or device associated to the higher value counter. An alarm signal is possibly raised too e.g., for replacing the defective individual switching plane or device.

13 Claims, 5 Drawing Sheets

U.S. PATENT DOCUMENTS

| | | |
|---|---|---|
| 5,539,756 A | 7/1996 | Glaise et al. |
| 5,694,407 A | 12/1997 | Glaise |
| 5,761,735 A | 6/1998 | Huon et al. |
| 5,818,815 A | 10/1998 | Carpentier et al. |
| 6,014,767 A | 1/2000 | Glaise |
| 6,055,235 A | 4/2000 | Blanc et al. |
| 6,097,725 A | 8/2000 | Glaise et al. |
| 6,101,187 A | 8/2000 | Cukier et al. |
| 6,108,334 A | 8/2000 | Blanc et al. |
| 6,125,114 A | 9/2000 | Blanc et al. |
| 6,189,124 B1 | 2/2001 | Glaise |
| 6,317,433 B1 | 11/2001 | Galand et al. |
| 6,324,164 B1 | 11/2001 | Luijten et al. |
| 6,343,081 B1 | 1/2002 | Blanc et al. |
| 6,370,610 B1 | 4/2002 | Glaise et al. |
| 6,411,599 B1 | 6/2002 | Blanc et al. |
| 6,421,660 B1 | 7/2002 | Glaise |
| 6,424,632 B1 | 7/2002 | Poret et al. |
| 6,452,900 B1 | 9/2002 | Blanc et al. |
| 6,522,269 B2 | 2/2003 | Blanc et al. |
| 6,584,124 B1 | 6/2003 | Glaise et al. |
| 6,606,300 B1 | 8/2003 | Blanc et al. |
| 6,661,786 B1 | 12/2003 | Abbiate et al. |
| 6,667,955 B1 | 12/2003 | Blanc et al. |
| 6,728,251 B1 | 4/2004 | Blanc et al. |
| 6,757,246 B2 * | 6/2004 | Alasti et al. ................. 370/230 |
| 6,760,303 B1 * | 7/2004 | Brouwer .................... 370/229 |
| 6,824,393 B2 | 11/2004 | Debord et al. |
| 7,142,555 B2 * | 11/2006 | Wang ......................... 370/429 |
| 2001/0036157 A1 | 11/2001 | Blanc et al. |
| 2002/0006110 A1 | 1/2002 | Brezzo et al. |
| 2002/0024455 A1 | 2/2002 | Abbiate et al. |
| 2002/0075871 A1 | 6/2002 | Blanc et al. |
| 2002/0144208 A1 | 10/2002 | Gallezot et al. |
| 2002/0182899 A1 | 12/2002 | Debord et al. |
| 2003/0048787 A1 | 3/2003 | Glaise et al. |
| 2003/0099250 A1 | 5/2003 | Blanc et al. |
| 2003/0118044 A1 | 6/2003 | Blanc et al. |
| 2003/0120992 A1 | 6/2003 | Glaise et al. |
| 2003/0182615 A1 | 9/2003 | Gallezot et al. |
| 2004/0103362 A1 | 5/2004 | Glaise et al. |
| 2004/0105384 A1 | 6/2004 | Gallezot et al. |
| 2004/0128094 A1 | 7/2004 | Blanc et al. |
| 2004/0136451 A1 | 7/2004 | Blanc et al. |
| 2004/0141504 A1 | 7/2004 | Blanc et al. |
| 2004/0141505 A1 | 7/2004 | Le Maut et al. |
| 2004/0141510 A1 | 7/2004 | Blanc et al. |
| 2004/0143593 A1 | 7/2004 | Le Maut et al. |
| 2004/0193997 A1 | 9/2004 | Gallezot et al. |

OTHER PUBLICATIONS

Proc, ICC'92, 311.1.1-311.1.5, 1992, by T. Aramaki et al., 'Parallel "ATOM" Switch Architecture For High-Speed ATM Networks.

* cited by examiner

| Up/Down Counters Shifting Up: | |
|---|---|
| One for a particular port of a plane | One link is out of order |
| All for a particular port | One egress adapter, or the communications line(s) connected to it, is out of order |
| All for a particular plane | One switching plane is out of order |

METHOD AND SYSTEM TO ENABLE AN ADAPTIVE LOAD BALANCING IN A PARALLEL PACKET SWITCH

FIELD OF THE INVENTION

The present invention relates to high speed switching of data packets in general and, is more particularly concerned with a method and a system to adapt the load balancing of the incoming traffic over the planes of a parallel packet switch (PPS) on the basis of the monitoring of requests and acknowledgments exchanged between ingress port adapters and arrays of collapsed virtual output queues (cVOQ) situated within the plane switch cores.

BACKGROUND OF THE INVENTION

To design and implement a high capacity packet-switch typically, having throughputs ranging from a few hundreds giga ($10^9$) to multi tera ($10^{12}$) bits per second and aggregating traffic from/to OC-768c or 40 Gbps ports, a practical architecture often considered to overcome the technology limitations that prevent from reaching directly this level of performance, is a parallel packet switch (PPS) architecture. As sketched in FIG. 1, a PPS is thus comprised of multiple identical lower-speed packet-switch planes e.g., four planes (100), operating independently and in parallel. In each ingress port-adapter (IA), such as (110), an incoming flow of packets (120) is thus spread (130), packet-by-packet, by a load balancer across the slower packet-switches, then recombined by a multiplexing function (140) in the egress part of each port-adapter (EA) e.g., (150). As seen by an arriving packet, a PPS is a single-stage packet-switch that needs to have only a fraction of the performance necessary to sustain a PPS port data rate (125). If four planes (100) are for example used, as shown in FIG. 1, their input (102) and output (104) ports need only to have one fourth of the performance that would otherwise be required to handle a full port data rate. More specifically, as an example, the four independent switches shown can have OC-192c or 10 Gbps ports. When associated they deliver OC-768c or 40 Gbps port speed provided that ingress and egress port-adapters (110, 150) are able to transparently load balance and recombine the packets. This approach is well known from the art and sometimes referred to as 'Inverse Multiplexing' or 'load balancing'. Among many publications on the subject one may e.g., refer to a paper published in Proc. ICC'92, 311.1.1-311.1.5, 1992, by T. ARAMAKI et al., untitled '*Parallel "ATOM" Switch Architecture for High-Speed ATM Networks*' which discusses the kind of architecture considered here.

The above scheme is also very attractive because of its inherent capability to support redundancy. By placing more planes than what is strictly necessary thus, five in the example of FIG. 1, it is possible to hot replace a defective plane without having to stop traffic. When a plane is detected as being, or becoming, defective ingress adapter load balancers can skip the defective plane and e.g., switch to a spare plane waiting in hot standby. When all the traffic from the defective plane has been drained out it can be removed and replaced by a new one. Hence, a PPS structure potentially also offers a graceful mode of degradation since, if installed planes are all used, one can still disable one of them and keep traffic moving through the ones left even though this is at a lower level of performance.

Thus, if PPS is really attractive to permit the implementation of very high-performance switches, with an architecture which is intrinsically redundant, a key requirement of carrier-class switches which need to operate 24-hour a day and 7-day a week, it remains that this is only achievable if load balancing (130) in each IA can actually performed accordingly. Especially, IA's must indeed be able to detect that a switching plane does not operate properly so as it can all be skipped. And, ideally, load balancing should be able to detect that a single port is not functioning properly in order that only traffic destined for it be not load balanced through the corresponding (partially) defective plane thus, fully taking advantage of a graceful mode of degradation since only one port on one plane would need to be skipped in that case while the rest of the switch continues to operate adequately.

Finally, load balancing should better be self-adaptive too so as it can dynamically react to the actual behavior of the switching planes. Although all IA's load balancing functions will attempt to evenly spread the traffic over all available planes and ports, hot spots may occasionally occur for a while in certain planes due to the nature of the traffic. Adaptive load balancing can take care of this by dynamically loading more the planes that are not congested.

It is then the purpose of the present invention to disclose a method and a system which enable a self adaptation of IA load balancing for all the situations mentioned above namely, to skip a complete switching plane if found defective or just one or a few ports of it, if a plane is only partially defective.

Also, self adaptation must occur if a plane, or ports of a plane, are detected as being temporarily congested in which case load balancing must tend to avoid loading more the congested plane and ports while congestion is in effect.

OBJECT OF THE INVENTION

Thus, it is a broad object of the invention to remedy the shortcomings of the prior art as described here above.

It is another object of the invention to provide a system and a method for dynamically evaluating the relative level of occupancy of the individual switching planes of a parallel packet switch.

It is a further object of the invention to provide a system and a method for dynamically adapting load balancing by analyzing in real time the actual behaving of the switching planes, without having to increase the exchanged of flow control information.

The accomplishment of these and other related objects is achieved by a method in an ingress port-adapter (IA) for dynamically evaluating the relative level of occupancy of the individual switching planes of a parallel packet switch, wherein a request is transmitted from said IA to one of said individual switching planes each time a data packet is received in said IA, said data packet being temporarily stored in said IA, and wherein an acknowledgment is returned from said one of said individual switching planes to said IA when said data packet can be processed, said method comprising the steps of:

computing, for each individual plane, the number of data packets waiting to be processed;

determining the range of data packets waiting to be processed among all individual switching planes; and, comparing said range of data packets waiting to be processed with at least one predetermined threshold, signaling each at least one predetermined threshold exceeded.

DETAILED DESCRIPTION OF THE PREFERRED EMBODIMENT

Figure 2:
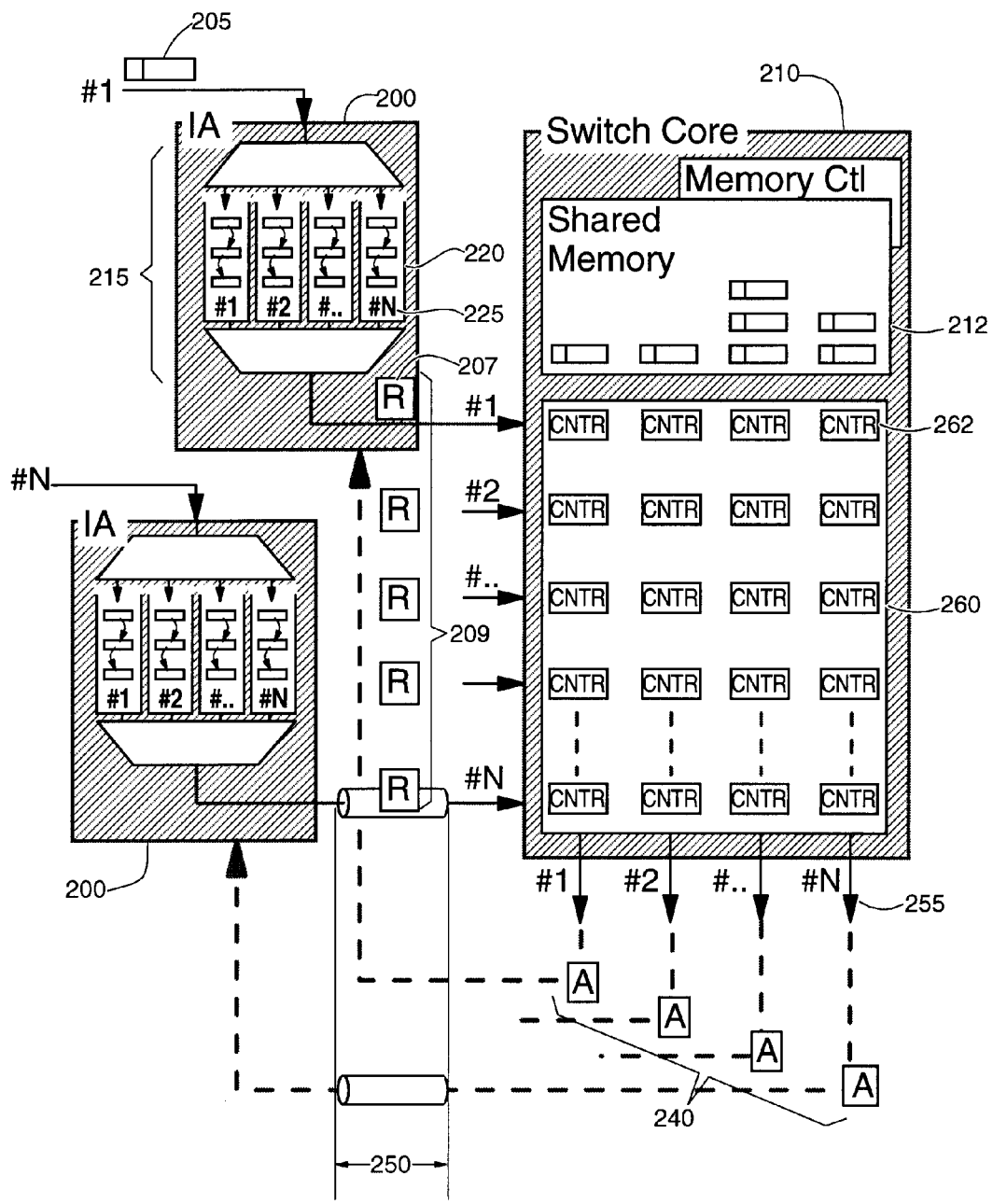
FIG. 2 describes the kind of parallel packet switch architecture adapted to implement the invention.

The invention assumes that PPS switching planes are of the kind shown in FIG. 2, referred to as collapsed virtual output queuing array (cVOQ). The mode of operation of such a fabric assumes that a request is sent from IA's (200) to the switch core (210) each time a data packet is received in an IA's, the data packet being temporarily stored in the IA. The switch core (210) returns acknowledgments (240) if there are enough switching resources left in switch core to allow incoming packets (205), waiting in IA's queues (215), to be admitted in core. For each incoming packet (205) there is a request (207) sent to the switch core so as to update, within switch core, the image of the corresponding IA queue, here taking the form of a simple counter (262) of requests. In this particular example of a switch core allowing to carry out the invention, switching is achieved with a shared-memory (212). Packets waiting in input queues (220) are admitted on reception of an acknowledgment (240) issued if enough room is left in shared-memory and if there are not too many packets already waiting for the corresponding output port, e.g., (255). The selection of which acknowledgments are returned is done on the basis of an algorithm that examines the image of all IA's queues (260) and referred to as a collapsed virtual output queuing or cVOQ array. Hence, cVOQ is in switch core the image of all IA's queues organized per destination (225), and in the general case per class of service, implementing a scheme well-known from the art referred to as 'virtual output queuing' (VOQ) which prevents all form of 'head of line' (HoL) blocking in IA's.

Whichever type of switch core is actually used the invention rests on the assumption that there is a means of evaluating the occupancy of the switch core, as viewed from each IA, for the particular traffic it received. Here, this is simply done by monitoring the requests versus the returned acknowledgments. Hence, if there is a persistent or growing deficit of acknowledgments as compared to the forwarded requests this is indicative that the plane is getting congested. This is further discussed in next figure.

Figure 3:
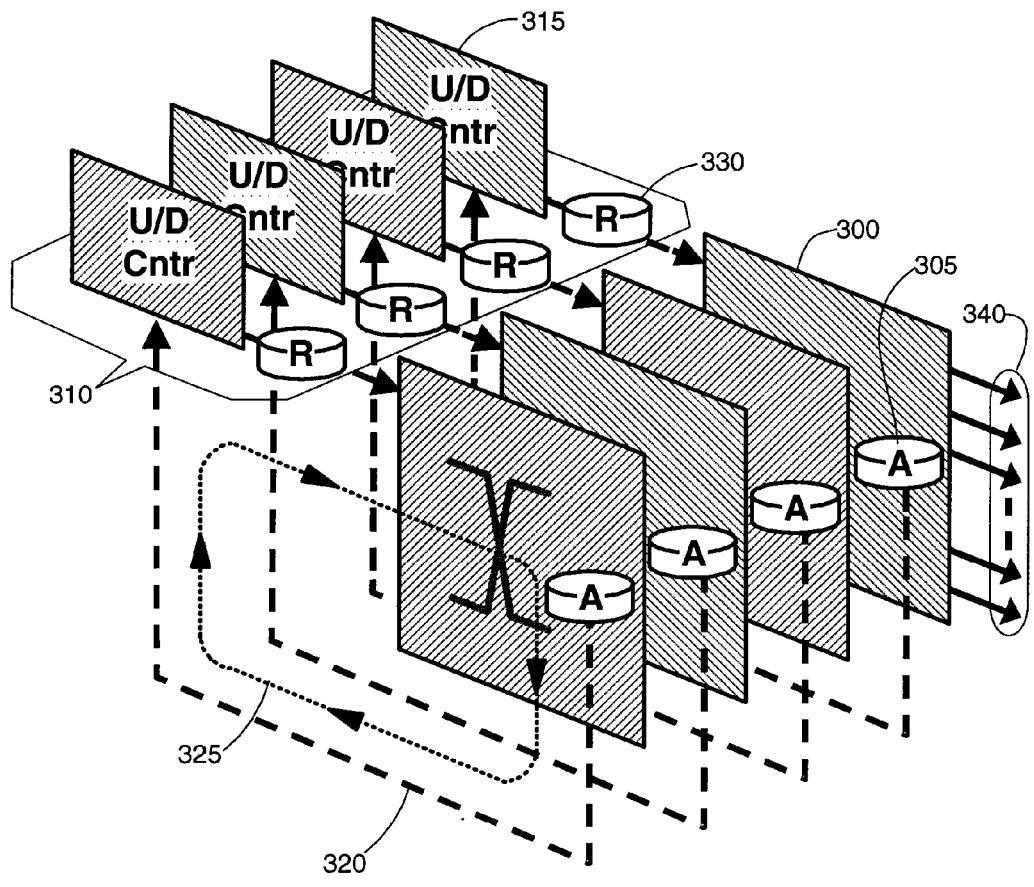
FIG. 3 discusses how plane congestion can be evaluated from each ingress port-adapter that can count independently the number of requests sent to each plane of a parallel packet switch structure.

FIG. 3 discusses how plane congestion can be evaluated from each IA (310) that can count independently the number of requests sent (330) to each plane (300) of a PPS structure. Counting is achieved with a set of up/down counters (315) incremented with each request departing from IA. It is decremented each time an acknowledgment (305) is returned from the corresponding plane.

Eventually, counters (315) must return to zero when all packets have been forwarded which is indicative of the fact that they all have been indeed processed. However, on a steady state traffic, the up/down counters normally indicate a deficit of acknowledgments since there are always some requests waiting in switch core to be acknowledged or traveling back to the source (320). Similarly, if switch planes are some distance apart thus connected through cables to the port adapters, as shown in FIG. 2 (250), the requests do not reach immediately the switch core. Depending on the physical implementation of a PPS structure and taking into consideration the processing time of the electronic boards that carry out the switching functions, round trip (325) time (RTT) may be significant and has to be expressed in packet-times at port speeds considered by the invention i.e., 10 Gbps and above.

If above implicitly assumes there is one up/down counter (315) per plane in order to count the overall number of requests load balanced per plane, nothing prevents from having a counter dedicated to each output port (340) though. This permits to obtain a finer monitoring of the hardware resources down to a per link and per plane basis. Hence, if the counter associated to a port of a particular plane starts to shift up while the others (the equivalent ones on the other planes) stay balanced the problem can be pinpointed to a particular link that ingress load balancer must start to skip enabling an automatic graceful mode of degradation. This should be reported to a central control point in order to schedule a maintenance or raise some form of alert.

Figure 1:
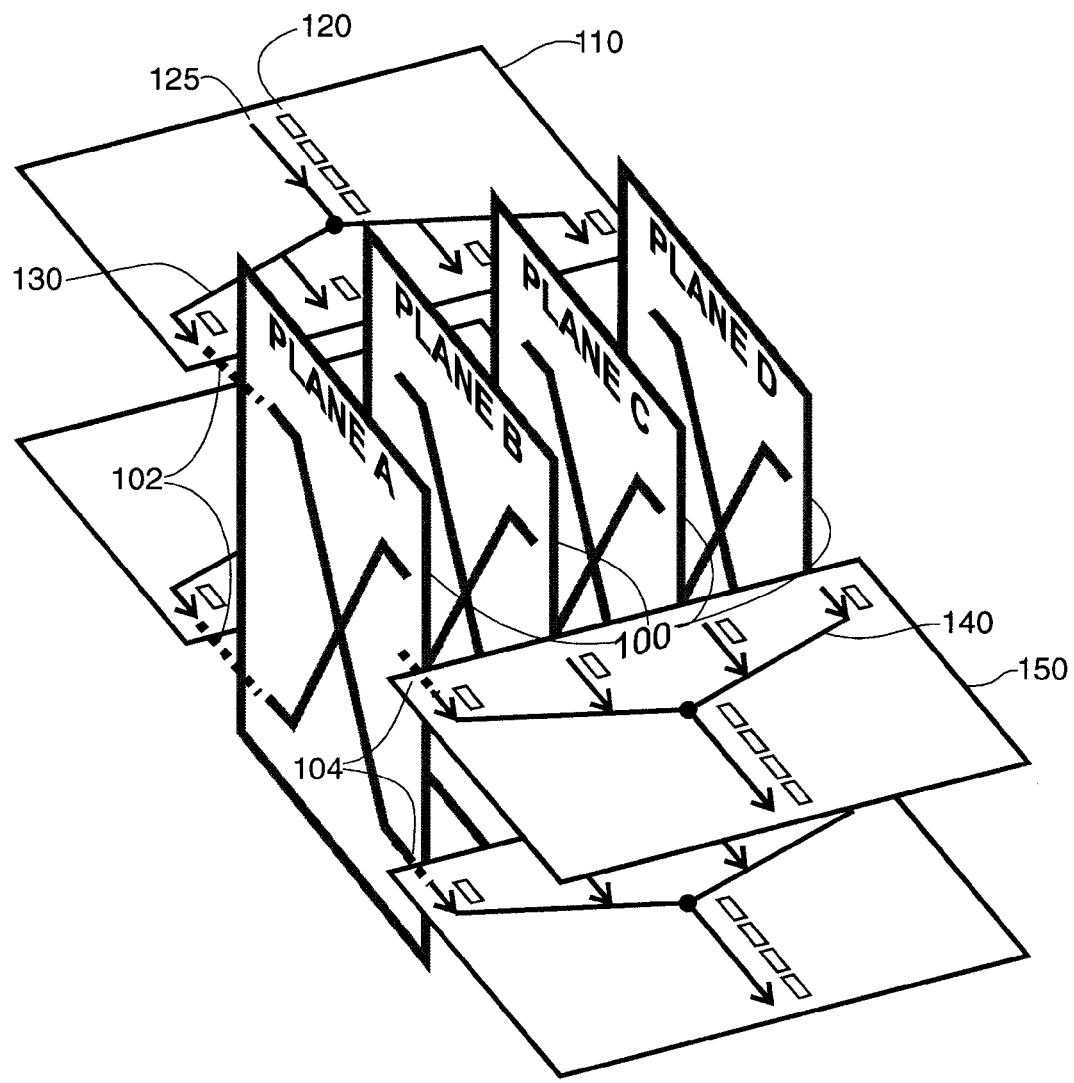
FIG. 1 represents a well known parallel packet switch architecture, comprising multiple identical lower-speed packet-switch planes operating independently and in parallel, wherein incoming flow of packets are spread in each ingress port-adapter, packet-by-packet, by a load balancer across the slower packet-switches, and then recombined in the egress port-adapters.

Similarly, if all the counters for a particular destination (output port) start to shift together this clearly means that the whole egress adapter i.e., (150) in FIG. 1, is no longer functioning properly, or the communications line(s) connected to it. This may trigger another type of alert and maintenance.

Table of FIG. 3 (350) summarizes the above discussion. Obviously, contingent to a particular implementation, more refinements could be brought to the isolation and graceful degradation modes possible thus, affecting only part of the hardware resources while the rest is still up and running. Also, the reporting to a central control point of all the information collected independently in IA's can help to further pinpoint a type of failure.

Figure 4:
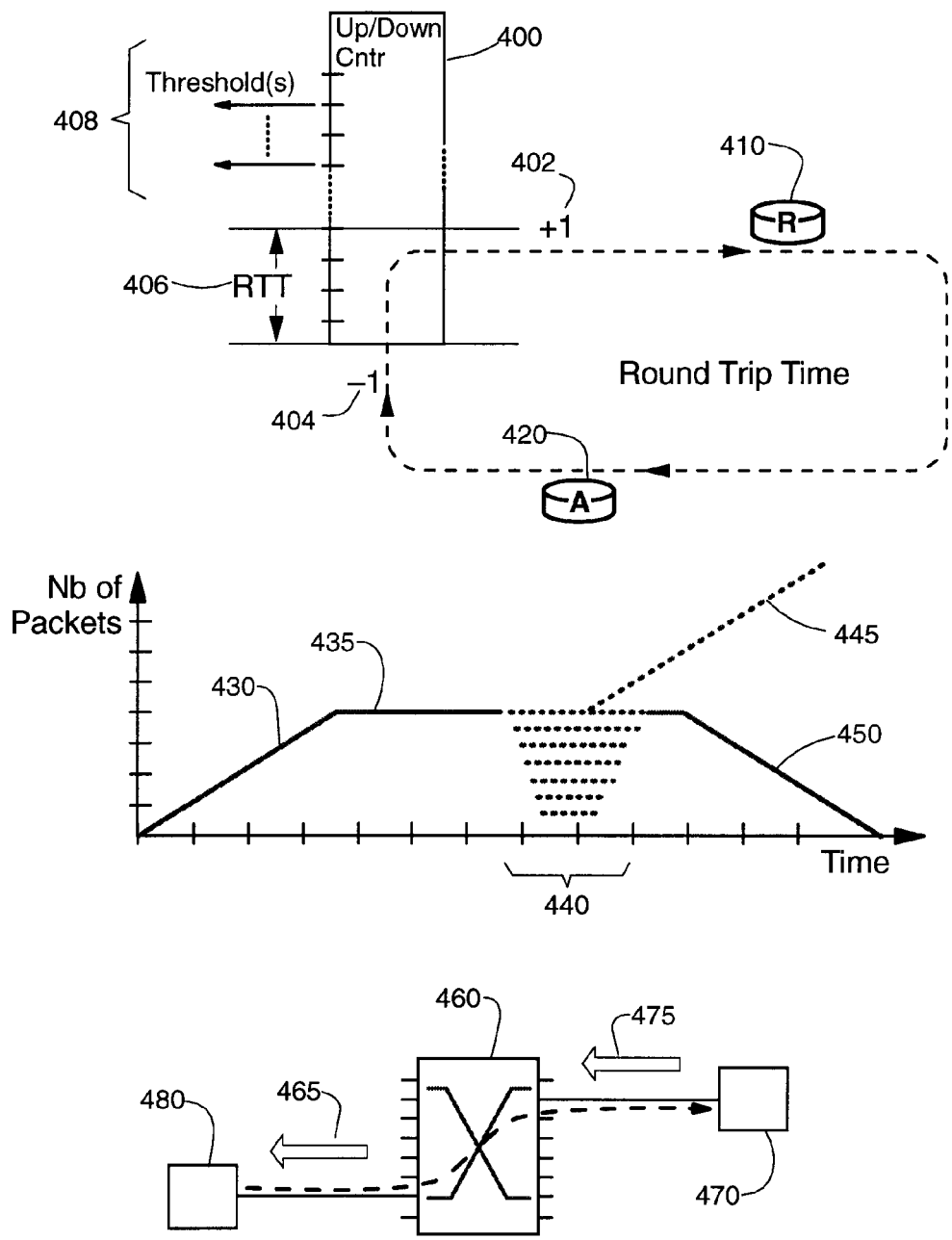
FIG. 4 further elaborates on the behaving of the used up/down counters.

FIG. 4 further elaborates on the behaving of the up/down counters. Again, there must have one up/down counter per physical resource to be monitored. This can be e.g., a whole switching plane, each port of a switching function, each port of a plane, down to each high-speed serial link of which port planes are made. Whichever level of granularity is considered, there must have requests (410) and acknowledgments (420) that are uniquely associate-able to a particular up/down counter (400) thus, identifying a given resource that will be possibly skipped if found defective, so as to support a graceful mode of degradation, or replaced by an equivalent resource held in standby.

Therefore, each counter (400) reflects the current difference between the forwarded requests (402) minus the returned acknowledgments (404). For a full continuous utilization of the resource associated to the counter this latter normally reaches a steady-state count of RTT packets (406) since one acknowledgment is coming back, after RTT packet-times, for each forwarded requests. Hence, at establishment of the traffic, value of the counter normally grows (430) and stabilizes (435) to RTT when resource is fully utilized. Obviously, any intermediate value (440) up to RTT, is likely to be observed over time since, resource may not be actually fully utilized and traffic is generally expected to fluctuate between zero and full utilization of the resource until it may returned eventually to zero (450) when no longer utilized.

However, if resource is malfunctioning, or is prevented from operating at nominal speed, counter value is going to shift up eventually beyond RTT (445) because requests must still be issued for processing new arriving packets, received from an upward situated source of traffic, while there is no, or less than nominal, return of acknowledgments. Therefore, the up shifting of a counter resource may be as well the result of an action taken by a downward device to flow-control its upwards situated counterpart. Networks, where switch fabrics are utilized, indeed need to implement a flow-control mechanism to avoid congestion and to pace the flows of traffic. This takes generally the form of a backpressure type of signal (475) issued by a downward device (470) to its upward source(s) of traffic here a switch according to the invention (460). If congestion lasts, this latter must in turn, issue backpressure signals (465) to the actual upward source(s) of traffic such as (480). Hence, the chief reason for which an up/down counter monitoring a resource may shift up beyond RTT is the result of actions taken by the network flow-control mechanism when a downward situated device cannot accept more traffic or at a pace lower than nominal. Then, counter (400) has associated thresholds (406) that can be used to determine when back-pressure signal (465) must be propagated.

Therefore, it must be clear that a counter such as (400) cannot be taken alone to decide if the particular resource it monitors is malfunctioning or not. Depending on the actual level of utilization of a network and of a switch fabric such as (460), the prime reason for which up/down counters may shift up beyond their normal RTT value is more likely due to network flow-control attempting to pace the flows of traffic especially, when traffic reaches, or is close to, full utilization of a set of available resources. Hence, groups of counters must rather be compared to decide if an individual resource, part of a group, is indeed malfunctioning.

At this point it is important to notice that RTT must be expressed in packet-time units of the corresponding resource to which a particular up/down counter is associated. In the type of switch fabric considered by the invention traffic is essentially load balanced on many parallel hardware resources so as to be able to reach the expected level of performance and/or to provide for redundancy. As an example, a switch fabric having ports specified at 40 Gbps actually, having to operate at 80 Gbps in order to deliver a speedup factor of two to take care of protocol overheads (e.g., encapsulation and segmentation and reassembly) and to absorb bursts of traffic may require 4 planes with 20-Gbps ports. In turn, implementing a 20-Gbps port will require the actual use of 8 high-speed serial links at 2.5 Gbps effective data rate. Hence, a typical 64-byte (i.e.: 512-bit) packet time when expressed in Ns (10−9 second) is only 512/80=6.4 Ns for a 80-Gbps port. However, packets are actually load balanced over four planes in this example. For an individual port plane, packet duration is four times higher i.e.: 512/20=25.6 Ns. And for an individual link at 2.5 Gbps, over which packets are finally load balanced so as to allow redundancy and graceful degradation down to a link, packet duration becomes 512/2.5=205 Ns. Hence, for a counter associated to a link, the rate at which packet are forwarded and received is, at full speed, of one per 205 Ns in this particular example. RTT must then be expressed in this unit of time for a counter watching a single link.

Figure 5:
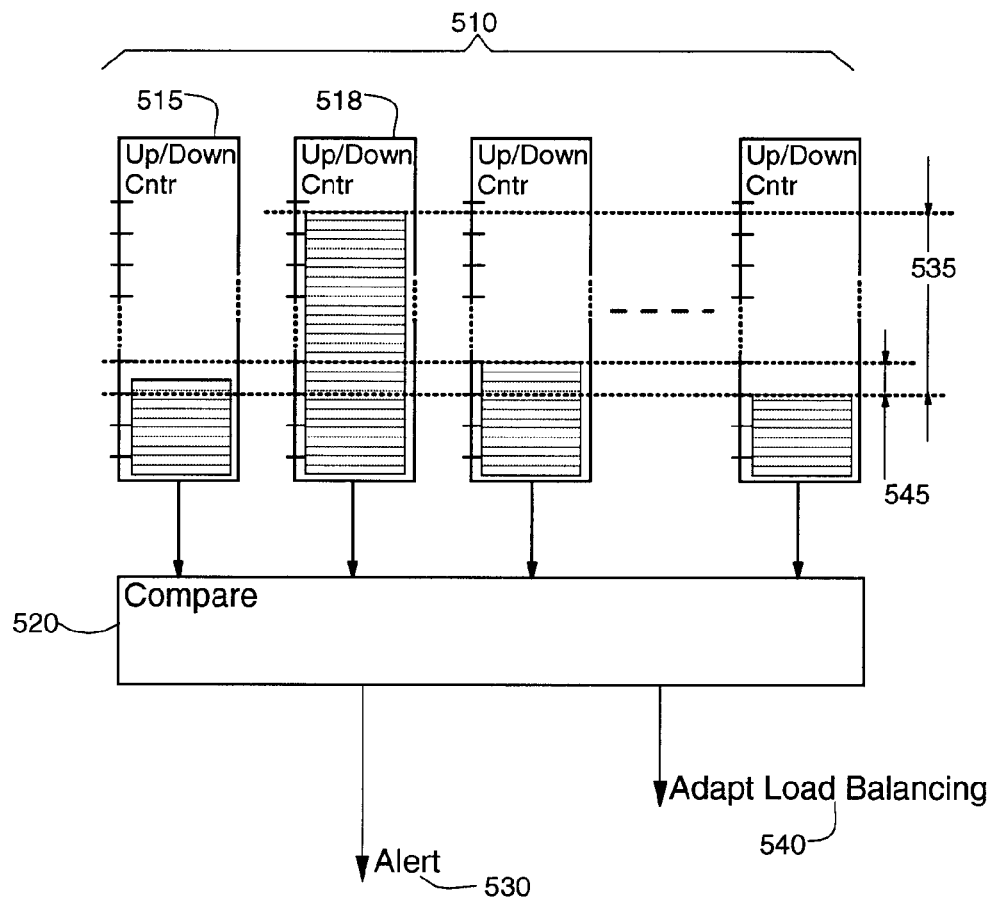
FIG. 5 describes how counters values must be used to determine when a resource is malfunctioning thus, should be skipped or replaced, and how load balancing over resources can be adapted.

FIG. 5 describes how counters values must be used to determine when a resource is malfunctioning thus, should be skipped or replaced, and how load balancing over resources can be adapted.

Up/down counters of the invention are assumed to belong to a group (510). Such a group is e.g., the group (310) of four counters shown in FIG. 3. In this particular elementary example there is one counter (515) per switching plane such as (300) which are the resources to be overall monitored. The switching planes are assumed to be identical thus, are expected to behave identically so that individual counter values can be compared (545, 535) together to make decisions. Because planes are identical, IA's load balancing function i.e., (130) in FIG. 1, is also assumed to load identically the four planes. Therefore, malfunction of one of the resources, here a switching plane, is determined through a different behaving of one of the counters vs. the others. If there is a single counter that grossly shifts up (518) while the others stay balanced (545) this is the clear indication that the corresponding plane is no longer functioning properly. This is true even if network flow-control discussed in FIG. 4 has issued back-pressure signals. In this case, all the planes are normally affected identically thus, all counters shift together. Indeed, if an egress switch port adapter such as (150) in FIG. 1 is getting congested because it is no longer authorize to forward traffic to a downward device e.g., (470) of FIG. 4, the resulting backpressure is eventually applied to all switching planes (100) that, together, implement a switch port.

Therefore, this is the comparison of the counters (520) rather than their individual values that permit to decide when a resource does no longer operate as expected.

An alert (530) can thus be issued to a control device when the result of the counters comparison (520) shows that one of them (518) is grossly or significantly behaving differently. Depending on a particular application, values beyond which an alert must be triggered can have to be set differently. Also, alert can be issued only after a significant period of time in order not to trigger any false alert. Setting of the thresholds, and integration times to trigger an alert, can therefore be very different from one application of the invention to another. Especially, threshold setting can be carried out in many ways. In its simplest form it can be an absolute range of waiting packets i.e., the observed difference between the minimum and maximum number of packets waiting in individual planes (535), which must not be normally exceeded. It can be as well a dynamic threshold expressed e.g., as a relative proportion of the total number of waiting packets in the switching planes or any other criterion applicable to a particular implementation of the invention that allows to pinpoint on the misbehaving of a particular switching resource.

Finally, when counters are all overall balanced (545) the smaller differences between their values can be further analyzed so as to feed back the information to the ingress adapters which can better adapt load balancing (540). As an example, statistical behaving of individual counters can be evaluated and their average values and/or standard deviations measured and compared from which decisions can be derived to better adapt load balancing over the switching planes. Clearly, if it can be determined that a counter has an average value which is always, or statistically significantly below the others then load balancing should attempt to load more the corresponding plane in proportion of the observed difference.

Above are just examples of what can be achieved with the up/down counters according to the invention. Those skilled in the art will recognize that many other applications can be considered beyond their utilization to monitor the resources of a switch fabric so as to implement all forms of active and passive redundancy or to adapt dynamically load balancing in a PPS like structure.

What is claimed is:

1. A method in an ingress port-adapter (IA) for dynamically evaluating the relative level of occupancy of the individual switching planes of a parallel packet switch, wherein a request is transmitted from said IA to one of said individual switching planes each time a data packet is received in said IA, said data packet being temporarily stored in said IA, and wherein an acknowledgment is returned from said one or said individual switching planes to said IA when said data packet can be processed, said method comprising the steps of:

computing, for each individual switching plane, the number of data packets waiting to be processed and determining the maximum of the numbers from among all the switching planes and the minimum of the numbers from among all the switching planes;

determining a range as a difference between the maximum and the minimum numbers;

comparing said range of data packets waiting to be processed with at least one predetermined threshold; and signaling each at least one predetermined threshold exceeded to a control device.

2. The method according to claim 1 wherein said computing step is automatically performed by an up/down counter incremented with each said transmitted request and decremented with each said returned acknowledgment.

3. The method according to claim 1 wherein said signaling step further comprises the step of: determining which at least one switching plane is responsible for said at least one predetermined threshold exceeded.

4. The method according to claim 3 wherein said signaling step and said determining steps are used for triggering the further step of: adapting load balancing over said switching planes.

5. The method according to claim 4 wherein said adapting step includes reducing a number of data packets to be processed by said at least one determined switching plane.

6. The method according to claim 4 wherein said adapting step includes skipping said at least one determined switching plane by said load balancing.

7. The method according to claim 4, wherein said adapting step includes shifting data packets away from said determined switching plane to others of said switching planes.

8. The method according to claim 1 wherein said signaling step execution is contingent to a minimum duration of a threshold crossing.

9. The method according to claim 1 wherein said signaling step is used to raise an alert signal depending on which said at least one threshold is exceeded.

10. The method according to claim 1 wherein said predetermined threshold is an absolute number of packets waiting to be processed.

11. The method according to claim 1 wherein said predetermined threshold is a relative number of packets waiting to be processed.

12. The method according to claim 1 wherein the level of occupancy of the switching resources are evaluated beyond said switching planes down to any identifiable physical switching resource and load balancing performed accordingly.

13. The method according to claim 12 wherein said identifiable physical switching resource is an individual serial link.

* * * * *